May 16, 1967    J. M. EITEL ETAL    3,319,935
APPARATUS FOR LASHING AND PLACING AERIAL CABLE AND STRAND
Filed Aug. 12, 1965    8 Sheets-Sheet 1

INVENTORS
Jay M. Eitel
Bertram J. Leigh
BY  Edward R. Williams

Attorneys

INVENTORS
Jay M. Eitel
Bertram J. Leigh
Edward R. Williams

Attorneys

INVENTORS
Jay M. Eitel
Bertram J. Leigh
Edward R. Williams

BY

Attorneys

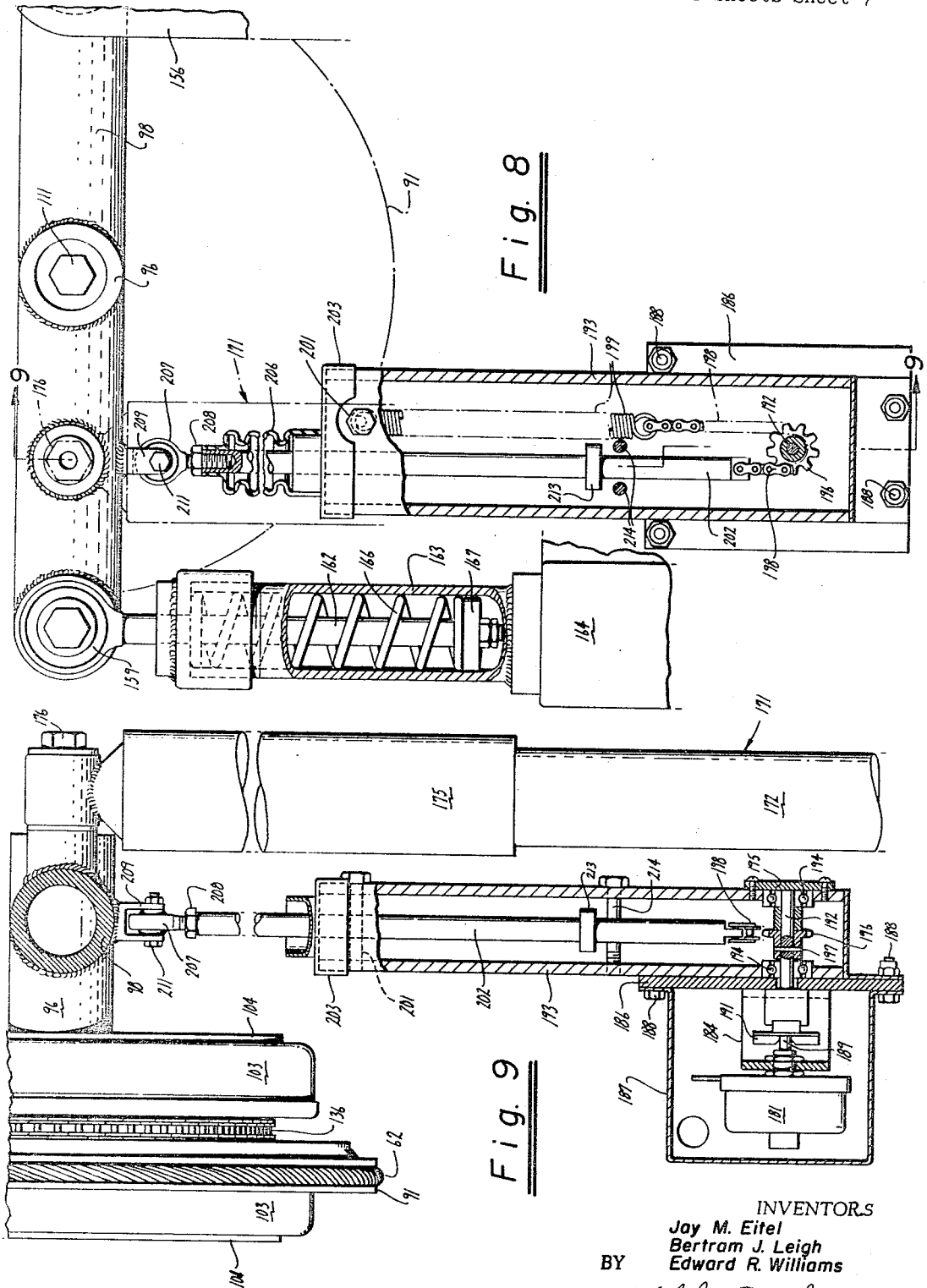

INVENTORS
Jay M. Eitel
Bertram J. Leigh
Edward R. Williams
BY
Attorneys

United States Patent Office 3,319,935
Patented May 16, 1967

3,319,935
APPARATUS FOR LASHING AND PLACING
AERIAL CABLE AND STRAND
Jay M. Eitel, Los Altos, Bertram J. Leigh, Redwood City, and Edward R. Williams, Los Altos, Calif., assignors, by mesne assignments, to Telsta Corporation, Carlos, Calif., a corporation of California
Filed Aug. 12, 1965, Ser. No. 479,212
17 Claims. (Cl. 254—134.3)

This invention relates to an apparatus for lashing and placing aerial cable and strand and more particularly to such an apparatus in which the cable and strand are pre-lashed.

Heretofore in the prelashing of cable, it has been difficult to properly tension the cable and strand so that the lashed cables in the strand are placed under the desired tension. This has been particularly difficult to accomplish because the reels for the cable and strand decrease in size and, therefore, make it difficult to apply the proper braking force to the reels carrying the cable and the strand. There is, therefore, a need for a new and improved apparatus and method for lashing and placing aerial cable and strand.

In general, it is an object of the present invention to provide an apparatus for lashing and placing aerial cable and strand which overcomes the above named disadvantages.

Another object of the invention is to provide an apparatus of the above character in which means is provided for measuring the output tension which is being applied to the strand.

Another object of the invention is to provide an apparatus of the above character in which the strand can be tensioned to a predetermined output tension.

Another object of the invention is to provide an apparatus of the above character in which a direct indication of the output tension being applied to the strand is given without making compensation for the input tension.

Another object of the invention is to provide an apparatus of the above character in which the tensioning of the strand can either be controlled from the cab of the vehicle or from the platform.

Another object of the invention is to provide an apparatus of the above character in which a single console is provided for the reel brakes and the tension brake.

Another object of the invention is to provide an apparatus of the above character in which a strand tension meter is provided which gives a direct reading of the output tension applied to the strand.

Another object of the invention is to provide an apparatus of the above character which can be utilized for other types of plant construction when it is not being utilized for prelashing.

Additional objects and features of the invention will appear from the following description in which the preferred embodiments are set forth in detail in conjunction with the accompanying drawings.

Referring to the drawings:

FIGURE 8 is an enlarged side elevational view with certain parts broken away of a portion of the apparatus shown in FIGURE 2.

FIGURE 9 is a cross-sectional view taken along the line 9—9 of FIGURE 8.

Figure 1:
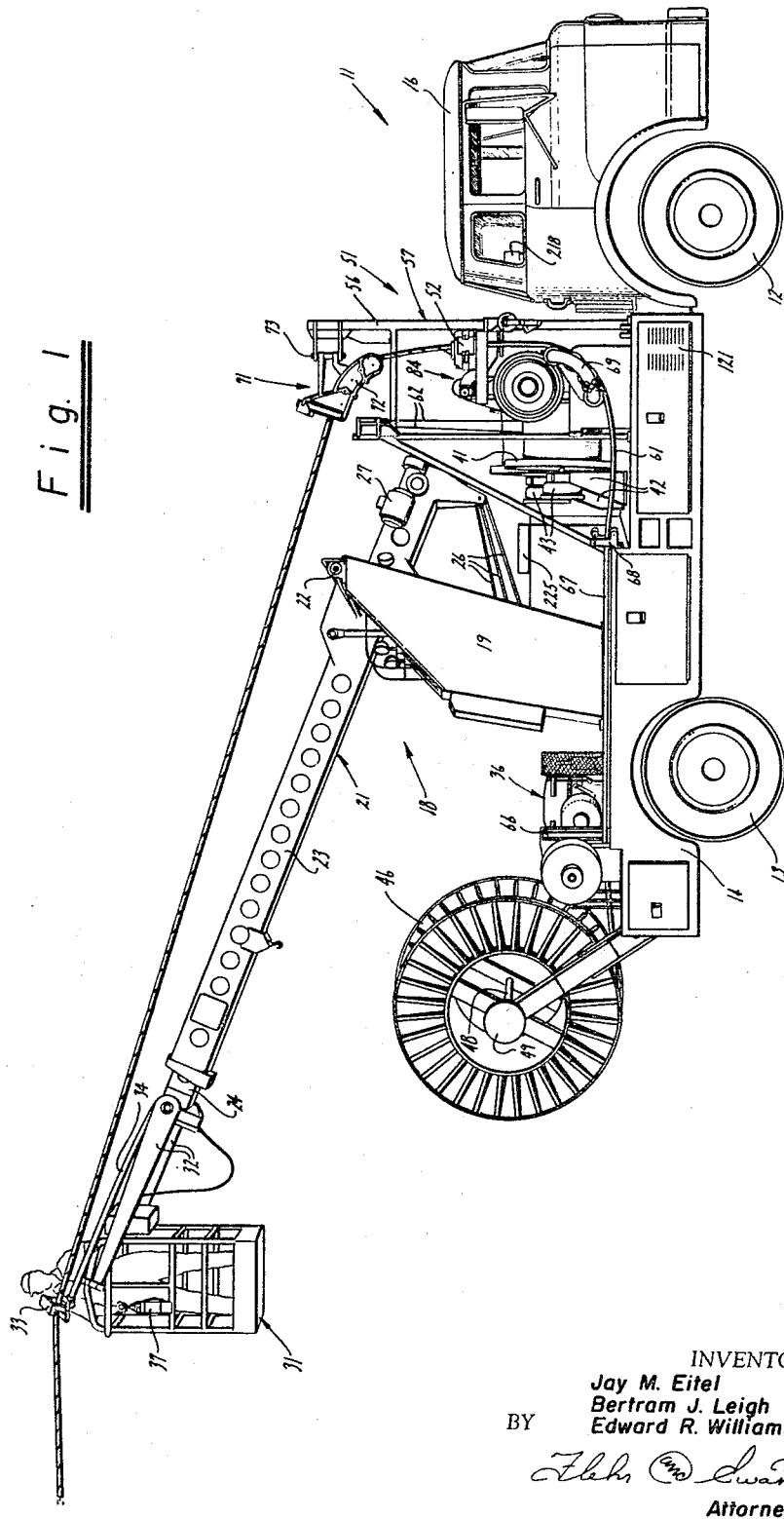
FIGURE 1 is a side elevational view of an apparatus for lashing and placing aerial cable and strand incorporating the present invention and which can be utilized for practicing the method incorporting the present invention.

In general, apparatus for lashing and placing aerial cable and strand consists of a mobile self-propelled vehicle in which a platform is mounted upon the vehicle. At least one reel of cable and one reel of strand are provided on or adjacent to the platform. Means is provided for rotatably mounting the cable reel and the strand reel. Lashing apparatus is carried upon the platform. Guiding means is also mounted on the platform and guides the cable and strand from the reels into the lashing apparatus. Means is provided for tensioning the strand. Means is also provided for measuring the tension on the strand so that the tensioning means for the strand can be adjusted to provide a desired tension on the strand.

As shown in the drawings, the apparatus for lashing and placing aerial cable and strand consists of a self-propelled vehicle 11 having front and rear wheels 12 and 13 and a chassis (not shown) upon which a platform 14 is mounted. A cab 16 is mounted on the front end of the chassis and contains means (not shown) for supplying motive power to the wheels 12 and 13.

A lifting equipment 18 is mounted on the platform 14. The lifting equipment can be of any suitable type such as one with an extensible boom structure as shown in the drawings, or alternatively it can be a boom of the articulated type. The lifting equipment 18 is provided with a load supporting structure or turret 19 which is mounted upon the platform in a manner such as shown in United States Letters Patent No. 2,841,404. As disclosed in that patent, the load supporting structure 19 is mounted for rotation about a vertical axis. An extensible boom structure 21 is mounted upon the load supporting structure 19 for rotation about a vertical axis formed by the pivot shaft 22. The extensible boom structure is provided with an outer boom section 23 and an inner telescoping boom section 24. Means is provided which includes a chain 26 for raising and lowering the outer end of the boom structure 21 about the horizontal axis 22 and is generally of the type disclosed in United States Letters Patents Nos. 3,055,459 and 2,996,141. Means is also provided for extending and retracting the inner telescoping boom section 24 with respect to the outer boom section 23 and includes a drive motor 27 and is generally of the type disclosed in United States Letters Patent No. 2,896,750.

A workman's or operators platform or basket 31 is mounted on the outer or free end of the boom structure 21 by suitable means such as pivotally contcting the same to a pair of arms 32 secured to the outer end of the inner boom section 24. A fairlead assembly 33 is mounted on an arm 34 carried by the boom structure 21. The fairlead assembly is similar to that described in United States Letters Patent No. 2,949,279.

Control means is provided for controlling the operation of the boom structure either from the workman's platform or basket 31 or from the ground or from the vehicle itself. Such means includes a motor generator set 36 which is mounted to the rear and one side of the platform 14. Suitable means which includes a control mechanism 37 mounted on the workman's platform or basket 31 is provided for supplying power from the motor generator set 36 to the electric motors which are utilized for rotating the lift support structure 19 about a vertical axis, raising and lowering the outer end of the boom structure about the horizontal axis 22 and for extending and retracting the inner boom section 24 with respect to the outer boom section 23. The control mechanism 37 is of the type described in United States Letters Patent No. 2,841,404.

At least one reel, and preferably two reels, 41 of strand are carried upon the vehicle 11. Means is provided for rotatably mounting the strand reels 41 adjacent the front end of the platform 14 to rear of the cab 16 and consists of pedestals 42 which rotatably carry the shafts (not shown) for the strand reels 41. An electric brake 43 is provided for each of the strand reels and is secured to the shaft of the strand reel for retarding or inhibiting the rotation of the stand reels 41 for reasons hereinafter described. The axes of rotation of the strand reels 41 are parallel to each other but are inclined with respect to the longitudinal axis of the vehicle 11.

At least one reel 46 of cable is mounted on or adjacent to the platform 14 and, as shown in FIGURE 1, is carried by the vehicle. Suitable means is provided for rotatably mounting the cable reel 46 and consists of a hydraulically operated lifting mechanism of the type described in copending application Ser. No. 390,988, filed Aug. 20, 1964, now Patent No. 3,279,758, and, therefore, will not be described in detail. A shaft 48 is carried by the lifting mechanism and serves to support the reel 46. An electric brake 49 is mounted on the lifting mechanism and is adapted to retard or inhibit rotational movement of the shaft 48 and the reel 46 carried thereby. The electric brakes 43 and 49 can be of a conventional type such as one manufactured by the Warner Electric Brake & Clutch Co.

A lashing assembly 51 is mounted on the front of the platform 14 behind the cab 16 and includes a lasher 52. The lasher 52 is of the type described in copending application Ser. No. 476,012, filed July 30, 1965. As described therein, it includes a stationary casing or housing 53 which is mounted upon a platform 54 secured to a vertical standard 56 forming a part of a support framework 57 positioned to the rear of the cab 16. A barrel 58 is rotatably mounted in the housing 53. The barrel is provided with a vertically disposed opening 59 extending therethrough through which the cable 61 and the strand 62 are adapted to pass. The lasher is provided with reels 63 of lashing wire 64 which is used for lashing teh cable 61 to the strand 62 as hereinafter described.

Figure 2:
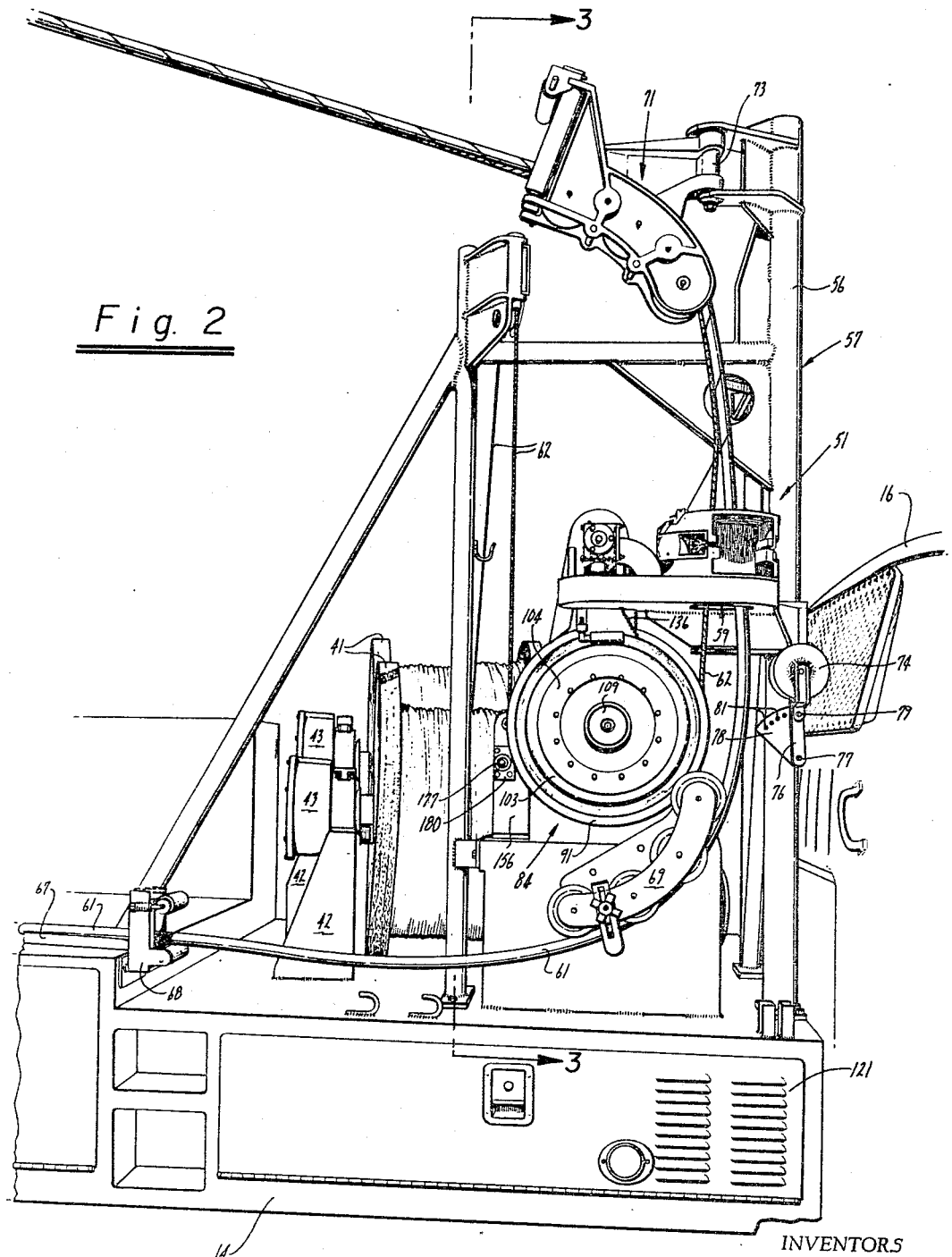
FIGURE 2 is an enlarged side elevational view of a portion of the apparatus shown in FIGURE 1.
Figure 3:
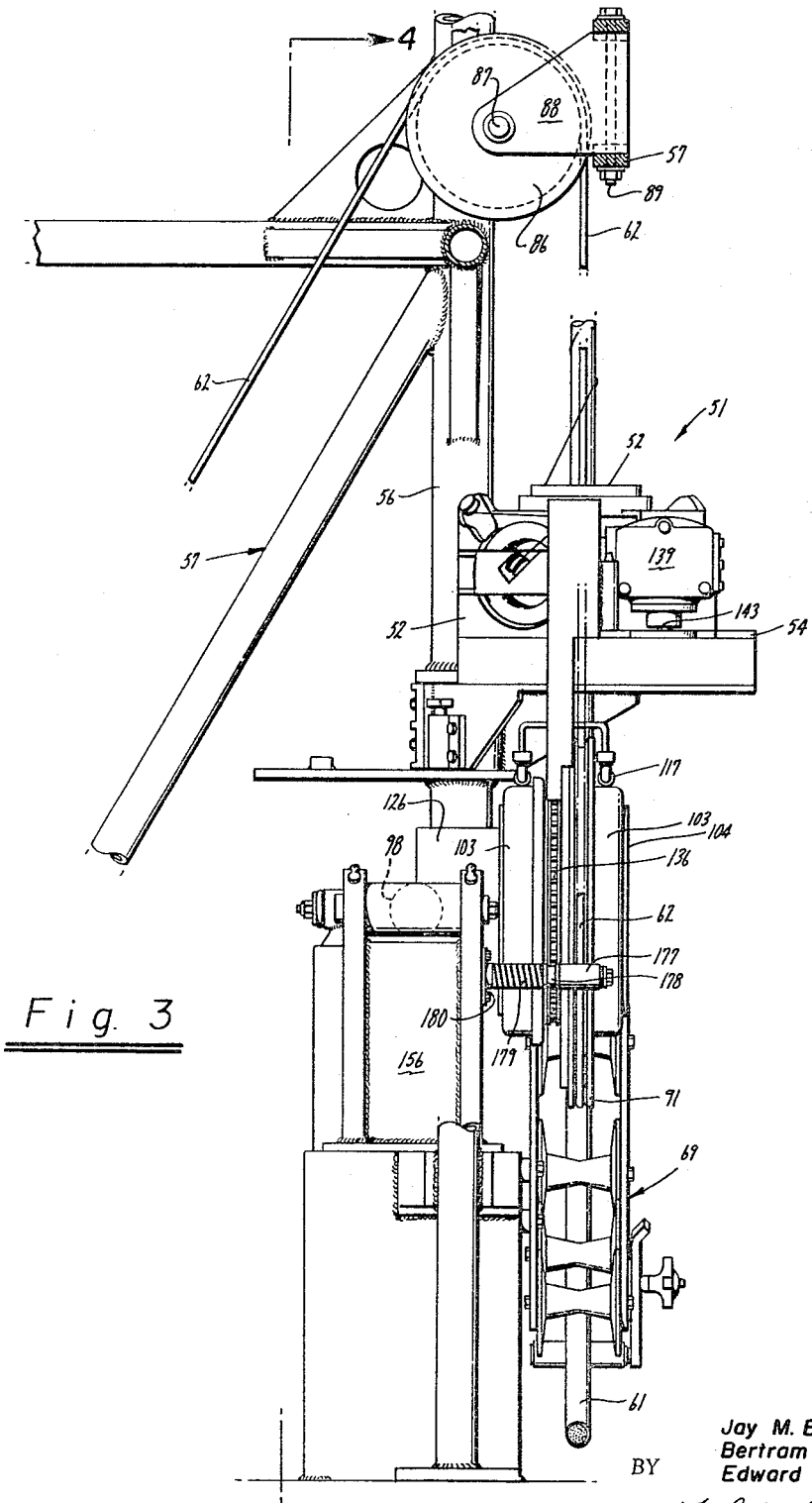
FIGURE 3 is a rear elevational view of the portion of the apparatus shown in FIGURE 2.

Means is provided for guiding the cable 61 from the cable reel 46 so that it extends upwardly into the opening 59 provided in the lasher 52 and consists of a guiding assembly 66 mounted on the platform 14 adjacent the rear of the platform. The cable 61 then passes through a U-shaped guide trough 67 mounted upon the platform and then through a fairlead assembly 68 similar to that described in United States Letters Patent No. 2,949,279, and thence to the lower section 69 of a swivel bull wheel assembly 71. The swivel bull wheel asembly 71 is very similar to that described in Patent No. 3,103,345 and includes an upper section 72 and which swivels about a pin 73 mounted upon the standard 56. The principal difference from the swivel bull wheel assembly 71 shown in United States Letters Patent No. 3,103,345 and the swivel bull wheel assembly shown in the present apparatus is that the upper and lower sections have been separated as shown particularly in FIGURE 2 to permit mounting the lashing assembly 51 between the same. A smaller roller 74 is provided adjacent the lower part of the lasher 52 and is rotatably mounted upon an arm 76 pivoted at 77 on a sector-shaped plate 78 and which is adapted to be retained in a desired angular position by a pin 79 that extends through one of the holes 81 provided in the upper portion of the sector-shaped plate 78 carried on the standard 56 as shown in FIGURE 2.

A strand guiding and tensioning assembly 84 is carried upon the platform 14 for guiding the strand 62 into the lasher 52 and for tensioning the strand 62. It consists of a sheave 86 which is rotatably mounted upon a pin 87 mounted in plates 88 swivel mounted upon a bolt 89 carried by the support framework 57. The strand 62 passes downwardly and around a strand sheave 91 and up through the opening 59 provided in the lasher 52. As will be noted particularly from FIGURE 5, the sheave 91 is provided with an annular groove 92 which is substantially V-shaped in cross-section so that the strand 62 frictionally engages the sheave 91 very firmly. The sheave 91 is secured to a circular plate 93 by suitable means such as welding. The plate 93 is affixed to a hub 94 and is rotatably mounted upon a large tube 96 by ball bearing assemblies 97. The tube 96 is secured to another large tube 98 extending at right angles to the tube 96.

A pair of electromagnetic brakes 101 and 102 are mounted upon the tube 96 and are of a type substantially identical to Model No. 1525 manufactured by the Warner Electric Brake & Clutch Co. Each of the brakes consists of an armature 103 which is secured to an annular plate 104 by cap screws 106. The plate 104 is secured to a sleeve 107 that is keyed to the tube 96 by keys 108. The sleeves 107 and the plates 104 secured thereto are retained on the tube 96 by a retaining ring 109 which is secured to the tube 98 by a large bolt 111 extending through the tube 98 coaxially of the tube 96 and through the retaining ring 109. Each of the armatures is provided with brake lining 112 which is adapted to be engaged by a brake shoe 113. The brake shoes 113 are slidably mounted upon pins 114 which extend through the brake shoes 113 and which are secured to the plate 93 and a block 116 secured to the plate 93. The pins 114 ensure that the brake shoes 113 travel with the sheave 91 as it is driven by the strand 62. Conduit boxes 117 are mounted on the brakes 101 and 102 for making electrical connections to the brakes.

Means is provided for cooling the brakes 101 and 102 and consists of a blower housing 121 which contains a blower (not shown) for supplying air under pressure to a flexible tube 122 to an entrance compartment 123 and thence to a circular chamber 124 formed by housing 126. The housing 126 is concentric with the tube 96 and has an open side facing the plate 104 of the brake 101. The plate 104 of the brake 101 is provided with openings 127 to permit air to pass from the compartment 124 into the brake 101. The plate 93 is provided with openings 128 to permit air to pass into the brake 102.

Figure 6:
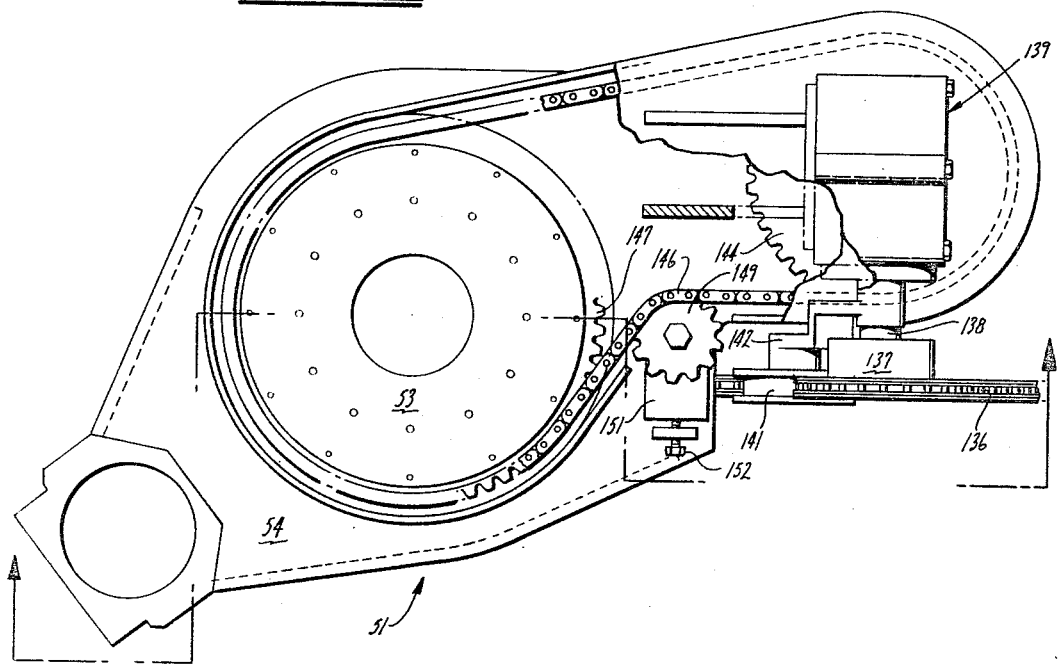
FIGURE 6 is an enlarged cross-sectional view taken along the line 6—6 of FIGURE 3.
Figure 7:
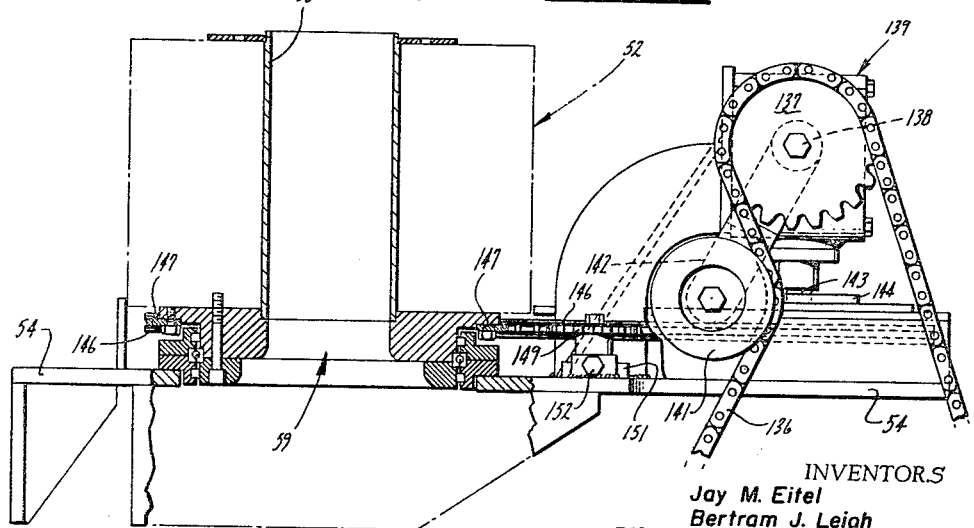
FIGURE 7 is a view looking along the line 7—7 of FIGURE 6.

Means is provided for driving the barrel 58 of the lasher 52 from the sheave 91 and consists of a sprocket 131 which is secured to the plate 93 by cap screws 132. The sprocket 131 is provided with openings 133 also to permit air to pass into the brake 102. The sprocket 131 drives a chain 136. The chain 136 drives a sprocket 137 secured to the input shaft of a right angle gear unit 139 of the type manufactured by Hub City Iron Works of Aberdeen, South Dakota. A chain tightening roller 141 is provided and is mounted upon an arm 142 and rotatably mounted upon the gear unit 139 through which the input shaft 138 extends, as shown particularly in FIGURE 6. The gear unit 139 has an output shaft 143 which drives a sprocket 144 which drives a chain 146. The chain 146 drives a large annular driven member in the form of a large annular continuous sprocket 147 which is secured directly to the barrel 58 of the lasher 52 as described in copending application Ser. No. 476,012, filed July 30, 1965. A chain-tightening roller 149 for the chain 146 is provided on the platform 54. The roller 149 is carried by a member 151 which is adapted to be adjustably positioned by a screw 152. Thus it can be seen that as the sheave 91 is rotated, the barrel 58 of the lasher will be positively driven.

Figure 4:
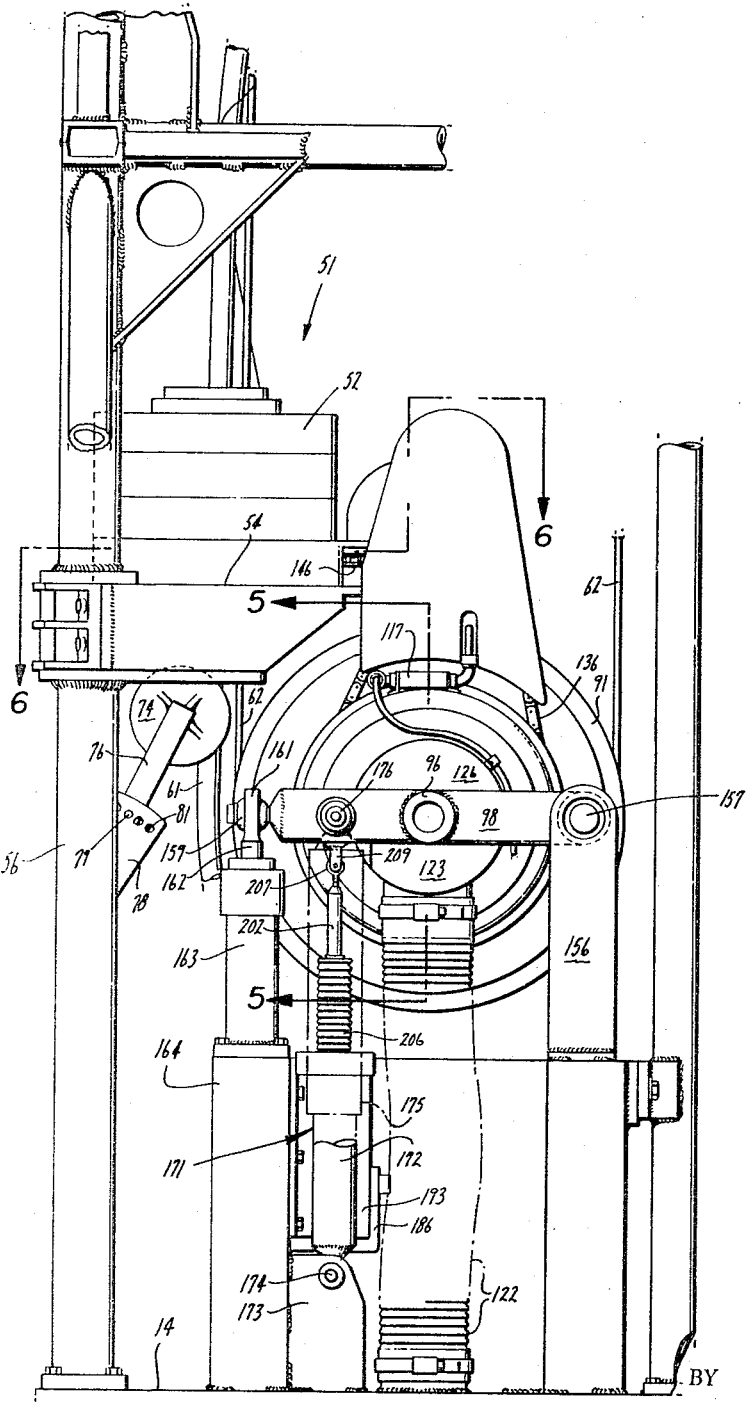
FIGURE 4 is another side elevational view of the apparatus shown in FIGURE 2.
Figure 5:
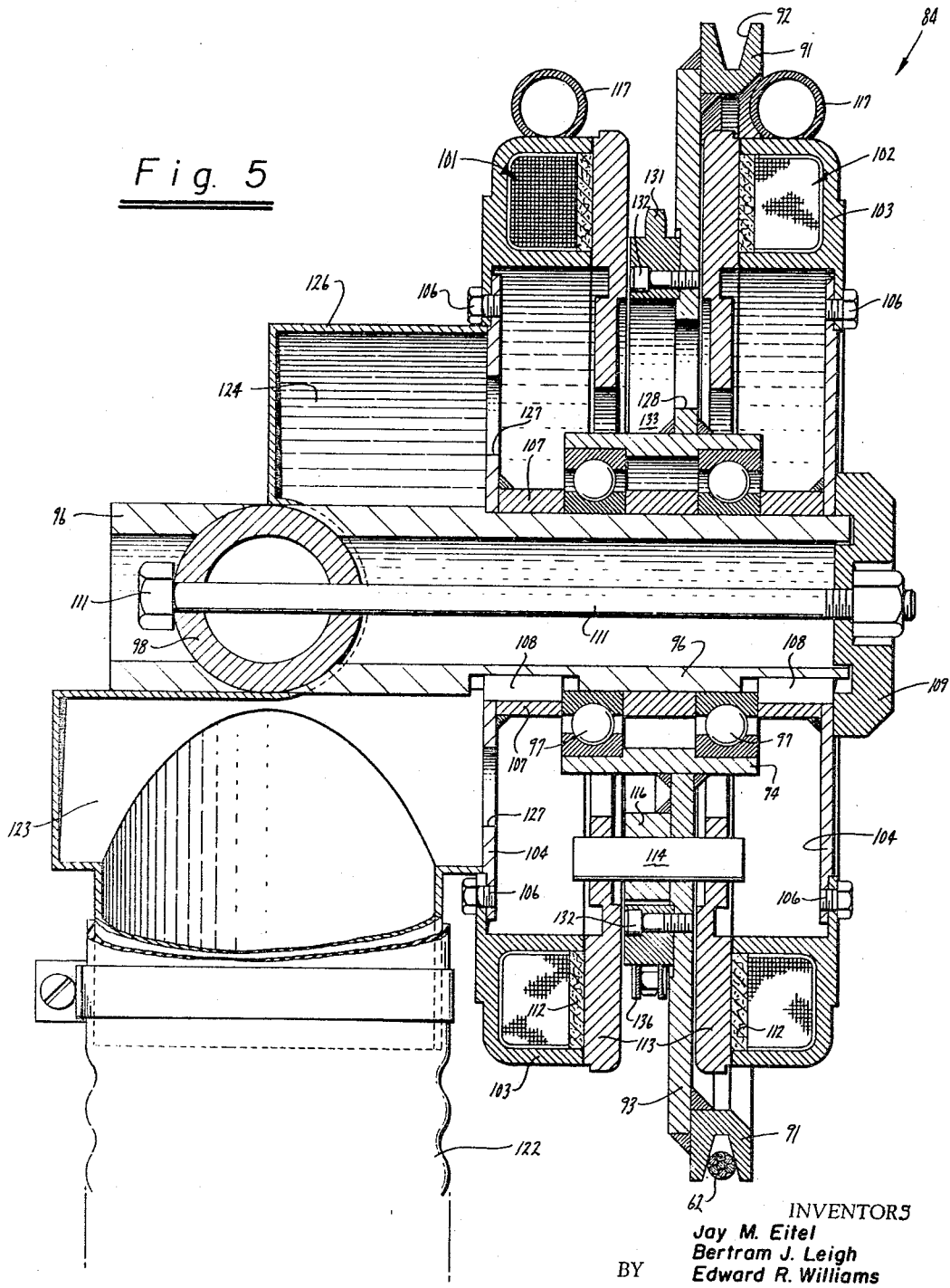
FIGURE 5 is an enlarged cross-sectional view taken along the line 5—5 of FIGURE 4.

From the construction shown in FIGURE 5, it can be seen that the brakes 101 and 102 mounted on the shaft 96 are cantilevered with respect to the tube 98. One end of the tube 98 is pivotally mounted upon a support structure 156 by a pin assembly 157. The other end of the tube 98 is provided with a ball and socket connection 159 which is connected to a plate 161. The plate 161 is connected to piston rods 162 which move in cylinders 163 mounted on a base 164 carried on the platform 14. Each cylinder 163 is provided with a large spring 166 which is engaged by the piston 167 carried by the rod 162. The springs 166 yieldably resist upward movement of the outer end of the tube or arm 98 under the force of the strand 62. Means is provided for damping rapid movement of the arm 98 and consists of a hydraulic dashpot 171 mounted on the arm 98. The dashpot consists of a piston 172 which is pivotally mounted on a plate 173 by pin 174 (see FIGURE 4). The piston 172 is disposed in a cylinder 175 having its upper end secured to the arm 98 for intermediate the ends of the same by a large cap screw 176. The dashpot 171 is provided with hydraulic fluid for damping the motion of the arm 98 in a manner well known to those skilled in the art.

A retaining roller 177 is mounted on a spindle 178 mounted on one end of a spring 179. The other end of the spring 179 is mounted on a bracket 180 secured to the support structure 156. The retaining roller 177 is normally retained in a position adjacent the strand sheave 91 to retain the strand 62 therein. The strand can be placed in sheave 91 merely by grasping the roller 177 and moving it away from the sheave 91 by bending the spring 179. When the roller 177 is released, the spring 179 will return it to its normal position.

Means is provided for measuring the movement of the arm 98 and for determining the tension being placed on the strand as hereinafter described and consists of a rheostat or potentiometer 181 having a resistance element 181 and a wiper 183. The rheostat 181 is mounted upon a bracket 184 secured to a plate 186. The plate 186 is mounted upon the base 164 carried on the platform 14. A case 187 is mounted over the rheostat and is secured to the plate 186 by bolts 188. The rheostat 181 is also provided with a shaft 189 which is connected to and drives the wiper 183. The shaft extends through the bracket 184 and is connected to a flexible coupling 191. The flexible coupling 191 is connected to a shaft 192 which is rotatably mounted in a housing 193 by bearings 194. A cover plate 195 is mounted on the housing and covers the end of the shaft 192 and one of the bearings 194. A sprocket 196 is secured to shaft 192 by a pin 197. The sprocket 196 is driven by a chain 198. One end of the chain 198 is yieldably retained by a spring 199 which has one end secured to one end of the chain 198 and which has the other end secured to a bolt 201 carried by the housing 193. The other end of the spring is secured to one end of a rod 202. The other end of the rod 202 extends upwardly through a cap 203 provided on the housing 193 and upwardly through a corrugated resilient protective sleeve 206 which has one end secured to the rod 202 and has the other end secured to the cap 203 to provide a dust-tight seal between the rod 202 and the cap 203 mounted upon the cylinder 193. An eye bolt 207 is threaded into the rod 202 and is provided with a lock nut 208 to lock it in a desired position. The eye bolt 207 is secured to a clevis 209 mounted on the lower portion of the pipe or arm 98 by a bolt 211. Means is provided for limiting the downward travel of the rod 202 and consists of a collar 213 mounted on the rod 202 and which is adapted to engage a pair of cap screws 214 provided in the housing 193.

Figure 10:
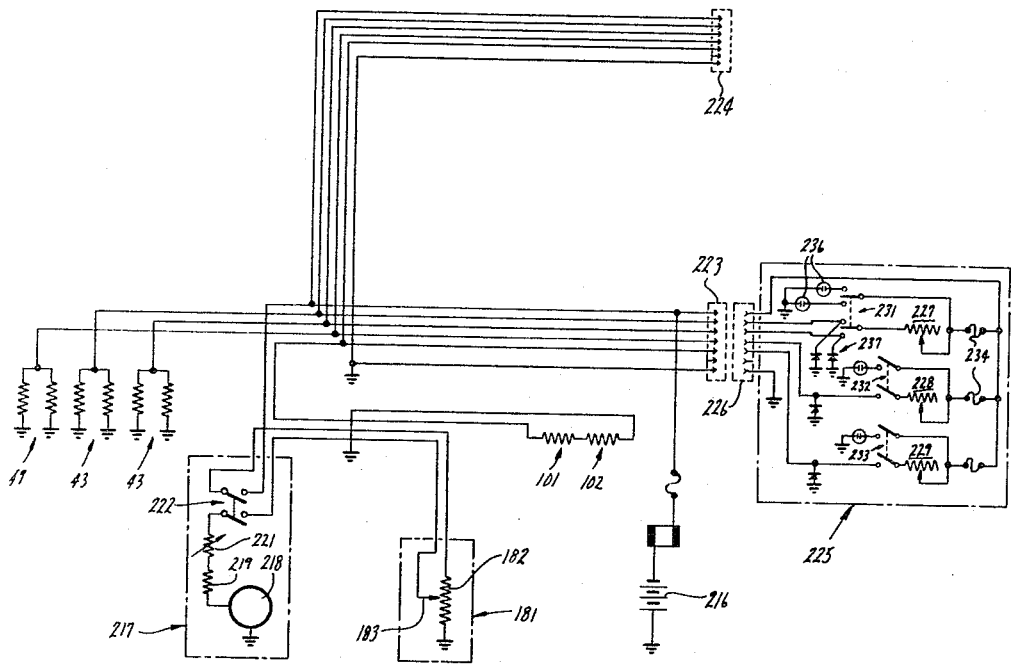
FIGURE 10 is a circuit diagram with certain parts schematically illustrated of the circuitry utilized in the present invention.

The apparatus for lashing and placing aerial cable and strand also includes electrical circuitry for operating the same. This electrical circuitry includes a suitable power supply such as a battery 216. As also shown in FIGURE 10, the circuitry includes the two strand brakes 43 and the cable brake 49. It also includes the rheostat 181 and a tension indicator 217. The tension indicator 217 consists of a meter 218 suitably calibrated as, for example, in foot pounds, a fixed resistance 219, a variable resistance 221, and a double pole switch 222. The circuitry also includes the strand sheave brakes 101 and 102. The unnumbered conductors comprising the circuitry are connected to two male type receptacles 223 and 224. Preferably, one is mounted on the platform 14 in a convenient position, whereas the other is mounted within the cab. A brake control console 225 is provided with a female type receptacle 226 adapted to receive either one of the receptacles 223 and 224. The brake control console 225 includes manually controlled potentiometers 227, 228 and 229. These potentiometers are connected to double pole switches 231, 232 and 233, respectively. As can be seen from FIGURE 10, the console 225 also includes a plurality of fuses 234 and indicator lights 236. Spark arresting diodes 237 are also provided to protect the contacts of switch 232 when it is opened.

Operation and use of the apparatus for lashing and placing aerial cable and strand may now be briefly described. The cable 61 and strand 62 desired to be placed in position are mounted upon the truck upon the strand wheels 41 upon the cable reel 46. Only one strand wheel is used at a time and the strand 62 from this reel is taken and placed over the sheave 86 and downwardly and under the sheave 91 and up through the opening 59 provided in the lasher 52 through the upper section 72 of the swivel bull wheel 71. The cable 61 from the reel 46 is placed in the trough 67 and passed under the lower section 69 of the bull wheel assembly 71 up through the opening 59 provided in the lasher 52 and over the upper section 72 of the swivel bull wheel assembly 71. The lashed cable and strand is then passed through the fairlead assembly 33 at the end of the boom structure 21.

In operating the apparatus, the operator, on either the platform 14 or in the cab 16 depending on where the control console 225 is located, first preselects the brake tension on the reel of strand which is chosen by first operating the switch 232 and then adjusting the potentiometer 227 to obtain the desired pre-tension on the strand reel. In general, this tension provided by the brake on the strand wheel should be sufficient to prevent the strand reel from overrunning and snagging the strand. After the amount of pre-tension has been selected, the tension on the main strand sheave 91 is selected by adjusting the potentiometer 229 for the strand sheave brakes 101 and 102. Thus, by adjusting the potentiometers 227 and 229, the operator can readily determine the total tension which will be applied to the strand during the stringing operation. The potentiometer 228 is adjusted to slightly tension the cable reel so that it will not overrun as cable 62 is withdrawn from it. By way of example, the tension placed on the strand can range from 1000 to 3000 lbs.

As soon as this has been accomplished, the operator can signal the winch truck or the winch operator to pull the strand and cable over to the pole line and dead-end it at the pole line. As the strand is pulled toward the pole line, the operator will be able to obtain an immediate reading of the tension which is being applied to the strand by reading the meter 218. If he is in the cab, it can be read in the cab, and if he is standing outside of the cab on the platform 14, he can read it through the rear window of the cab 16. The meter 218 can then be calibrated in any desired manner; for example, it can be calibrated directly in foot pounds. The operator, merely by watching the meter 218, can determine under what tension the strand and the cable are being placed, and then readily adjust the potentiometers 227, 228 and 229 to obtain the desired tension. Preferably, the primary adjustment is provided by the potentiometer 229.

During the stringing, it should be appreciated that the meter 218 will give a direct reading in foot pounds and give the total load which is being placed on the strand at the output from the lashing assembly 52 which includes the pre-tensioning of the strand by braking of the strand reel. The means for measuring the tension is particularly unique because the pivot 157 for the arm 98 is generally in line with the strand 62 as it passes downwardly over the strand reel 91. The outer end of the arm 98 is generally in line with the point at which the strand 62 leaves the strand reel 91. Because of this reason, the travel of the arm 98 is directly related to the amount of tension which is being applied to the strand 62. No compensation need be made for the tension applied to the strand at the input to the guiding and tensioning assembly 85. This is true because there is no force moment about the pivot 157. Thus, the meter 218 reads the total amount of tension which is supplied to the strand at the output of the assembly 85. This total tension does include the pre-loading force which is applied to the strand.

The apparatus can be used either with the vehicle 11 stationary, or with it moving. When the vehicle is stationary, the lashed cable and strand can be towed into place by another truck or other equipment. When the vehicle is moving, the lashed cable and strand is dead-ended as hereinbefore described, and then the vehicle is advanced with one man in the cab 16 controlling the vehicle and the lashing from the control console 225 in the cab, and with the other man in the workman's basket 31 placing the prelashed strand and cable on the poles as the vehicle travels down the road.

It is apparent from the foregoing that we have provided a new and improved apparatus for lashing and placing aerial cable and strand in which it is possible for the operator to determine exactly the amount of pre-tensioning which is being applied to the cable as it is being placed in position. The apparatus is particularly compact with the lashing assembly being positioned at one corner of the platform between the upper and lower sections of the bull wheel assembly. Very little additional space is required for guiding and tensioning assembly.

We claim:

1. In apparatus for placing aerial cable and strand, a platform, at least one reel of cable, means for rotatably mounting the reel of cable so that it is positioned in the vicinity of the platform, at least one reel of strand, means for rotatably mounting the reel of strand on the platform, lashing apparatus carried upon the platform, guiding means mounted on the platform for guiding the reel of cable into the lasher, means mounted on the platform for guiding the strand from the reel of strand into the lashing apparatus, means for guiding and applying a tension to the strand before it passes into the lasher, means connected to the means for guiding and applying a tension to the strand giving an indication of the amount of tension applied to the strand, said means for guiding and applying a tension including a sheave frictionally engaged by the strand, an arm, means rotatably mounting the sheave on the arm, and means pivotally mounting one end of the arm for movement about a pivot point, said means connected to the means for guiding and applying a tension and giving an indication including means for measuring the movement of said arm about said pivot point.

2. Apparatus as in claim 1 wherein said pivot point is substantially in line with the point on the circumference of the sheave at which the strand leaves the sheave and together with means mounted on said arm at a point substantially in line with the point at which the strand enters the sheave yieldably restraining movement of said arm about said pivot point.

3. Apparatus as in claim 1 wherein said means for measuring the movement of said arm includes a meter, a power supply, a potentiometer having a movable element connected between said meter and said power supply, and means connecting said movable element to said arm whereby the position of said movable element is shifted as said arm is moved.

4. Apparatus as in claim 1 wherein the sheave and the arm to which it is secured are moved in one direction about said pivot point by tension being applied to the strand together with means connected to the arm and yieldably restraining movement of the arm in said one direction.

5. Apparatus as in claim 4 together with dashpot means connected to the arm for damping the movement of the arm.

6. In apparatus for placing aerial cable and strand, a platform, at least one reel of cable, means for rotatably mounting the reel of cable so that it is positioned in the vicinity of the platform, means mounted on the means for rotatably mounting the reel of cable for restraining the rotation of the reel of cable as the cable is unreeled therefrom, at least one reel of strand, means for rotatably mounting the reel of strand on the platform, means mounted on the means for rotatably mounting the reel of strand for restraining the rotation of the reel of strand as the reel of strand is unwound to thereby apply a pre-tension to the strand, lashing apparatus carried upon the platform, guiding means mounted on the platform for guiding cable from the reel of cable into the lashing apparatus, means for guiding the strand from the reel of strand into the lashing apparatus, said means for guiding the reel of strand into the lashing apparatus including a sheave having a groove therein adapted to be frictionally engaged by the strand, brake means for retarding rotation of the sheave, means mounted on the platform for guiding the cable and strand after it has been lashed by the lashing apparatus, said means for guiding the cable and the means for guiding the cable and strand after it has been lashed including a cable guiding device formed in two sections in which one section is positioned adjacent the entrance to the lashing apparatus and the other section is positioned adjacent the outlet from the lashing apparatus.

7. Apparatus as in claim 6 wherein said lashing apparatus is provided with a barrel rotatably mounted therein having an opening extending therethrough, and wherein the lashing apparatus is mounted on the platform so that the passage extending therethrough is disposed in a substantially vertical position between said cable guiding device so that said two sections of said cable guiding device are disposed above and below the lashing apparatus.

8. Apparatus as in claim 6 wherein said sheave is urged in one direction as tension is applied to the strand, together with means for yieldably restraining movement of said sheave in said one direction, and means for measuring the movement of the sheave to determine the tension being applied to the strand.

9. Apparatus as in claim 8 wherein said means for measuring the movement of the sheave includes a meter, a source of power, potentiometer means having a movable element and connected between the meter and the source of power, and means carried by the sheave for adjusting the position of the movable element of the potentiometer in accordance with the position of the sheave.

10. Apparatus as in claim 9 wherein said means for adjusting the position of the movable element includes a wheel-like member secured to the movable element, and chain-like means engaging the wheel-like member, one end of said chain-like means being secured in a fixed position and the other end of said chain-like means being connected to said sheave for movement with said sheave in said one direction.

11. Apparatus as in claim 6 together with an arm, means rotatably mounting the sheave on the arm, means pivotally mounting one end of the arm on the platform for movement about a pivot point, and means yieldably restraining movement of the other end of the arm in one direction about the pivot point.

12. Apparatus as in claim 8 wherein said means for measuring the movement of the sheave includes a meter, a source of power, a potentiometer having a movable element and connected between said source of power and said meter, a sprocket wheel connected to the movable element of said potentiometer, a chain having one end secured to said platform in a fixed position, said chain engaging said sprocket wheel and means connecting the other end of said chain to said arm so that as said arm is moved, said sprocket is rotated.

13. Apparatus as in claim 6 wherein said means for retarding rotation of the cable reel includes an electric brake, wherein said means for retarding the rotation of the strand reel includes an electric brake and wherein said brake means for retarding rotation of the sheave includes an electric brake, a source of power, and potentiometer means for adjusting the braking force applied by each of said brakes.

14. In apparatus for placing aerial cable and strand, a wheeled self-propelled vehicle having a chassis and a cab mounted on the front end of the chassis, a platform mounted on the chassis to the rear of the cab, at least one reel of cable, means for rotatably mounting the reel of cable so that it is positioned in the vicinity of the platform, electric brake means for retarding the rotation of the reel of cable, at least one reel of strand, means rotatably mounting the reel of strand so that it is in the vicinity of the platform, electric brake means for retarding rotation of the reel of strand, a lifting equipment, said lifting equipment including a lift supporting structure rotatably mounted upon the platform for movement about a vertical axis and a boom structure mounted on the lift supporting structure for movement about a horizontal axis, cable guiding means carried by the boom structure, a lasher assembly mounted upon the platform, guide means for guiding the cable from the cable reel into said lashing apparatus, additional guide means for guiding the strand into the lashing apparatus and for tensioning the strand, said additional guide means including an arm, means pivotally mounting one end of the arm on the platform, a sheave adapted to be engaged by the strand, means rotatably mounting the sheave on the arm, electric brake means for retarding the movement of said sheave, said means for retarding the movement of said sheave serving to apply tension to the strand which causes the sheave and the arm carried thereby to be moved in one direction, means connected to the arm for yieldably restraining movement of said arm in said one direction, and means for sensing the movement of said arm in said one direction against the force of the yieldable means.

15. Apparatus as in claim 14 wherein said means for sensing the position of the arm includes a meter, a source of power, potentiometer means including a movable element and connected between the meter and the source of power, and means connecting the movable element to the arm whereby said meter gives a direct indication of the tension being applied to the strand.

16. Apparatus as in claim 15 together with means connecting the source of power to the electric brakes, said connecting means including at least one rheostat for each electric brake.

17. Apparatus as in claim 14 wherein said lasher assembly has an opening extending therethrough and wherein said lasher assembly is mounted on the platform so that the opening is vertically disposed and wherein the means for guiding the cable into the lasher includes an arcuate cable guiding device disposed below the lasher assembly together with additional cable guiding means mounted above the lasher assembly for guiding the cable and strand as it passes from the lasher, said additional cable guiding means being castered with respect to said platform.

References Cited by the Examiner

UNITED STATES PATENTS 2,703,218   3/1955   Haskell et al. _____ 254—134.3

OTHELL M. SIMPSON, *Primary Examiner.*